E. J. LOBDELL.
WHEEL RIM.
APPLICATION FILED MAY 3, 1916.
1,223,990.
Patented Apr. 24, 1917.
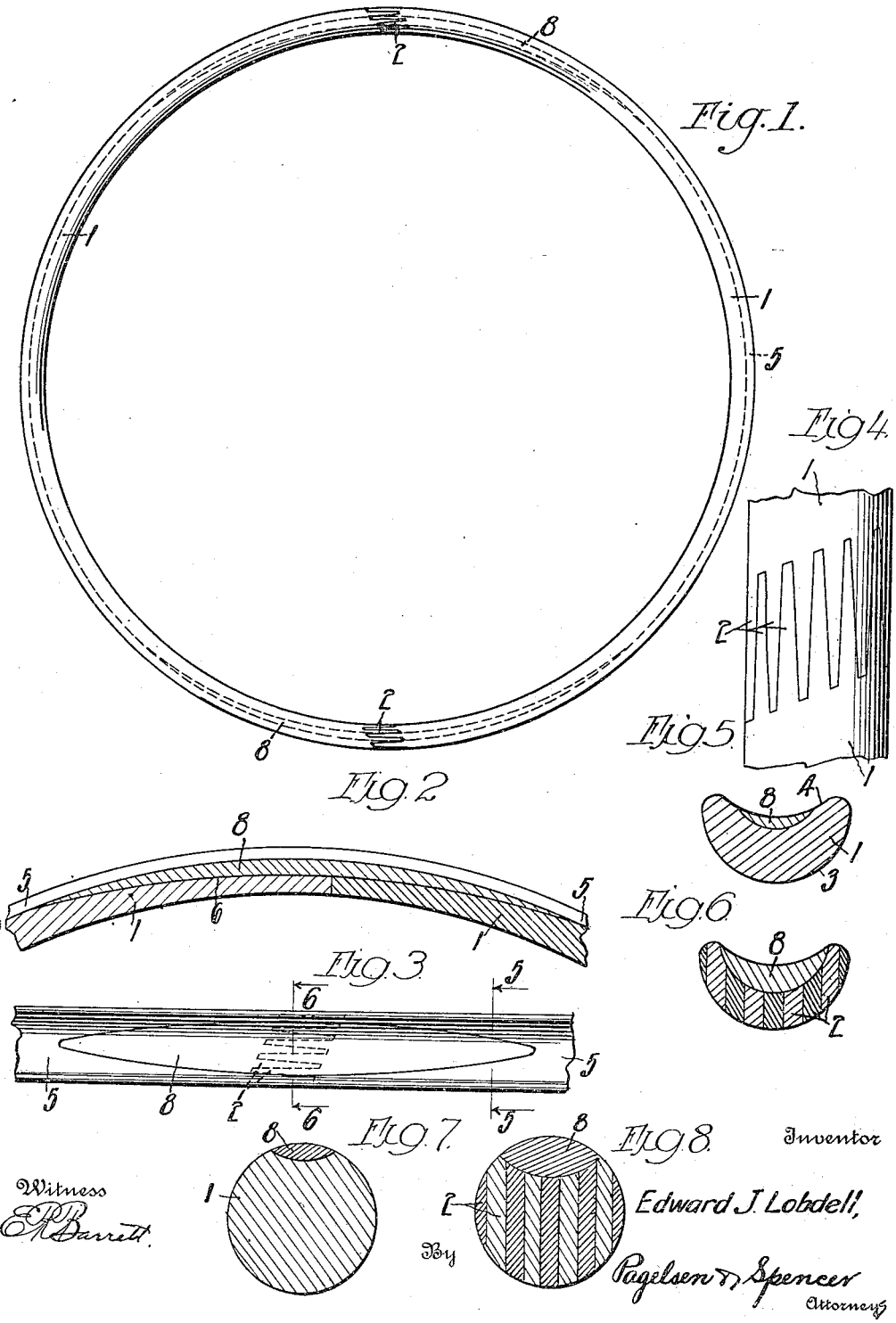

UNITED STATES PATENT OFFICE.

EDWARD J. LOBDELL, OF ONAWAY, MICHIGAN.

WHEEL-RIM.

1,223,990.

Specification of Letters Patent.

Patented Apr. 24, 1917.

Application filed May 3, 1916. Serial No. 95,025.

*To all whom it may concern:*

Be it known that I, EDWARD J. LOBDELL, a citizen of the United States, and residing at Onaway, in the county of Presque Isle and State of Michigan, have invented a new and Improved Wheel-Rim, of which the following is a specification.

It has been customary to make wooden wheel-rims for bicycles of two concentric members, the outer surface of the inner of which was grooved transversely, the inner surface of the outer member being convex transversely to conform to the groove in the inner member. Because of difficulties of manufacture and for other reasons, this construction has not been satisfactory.

The purpose of the present invention is to overcome the objections referred to; and in order to secure these ends, the invention consists in a wheel-rim having its inner circumferential member formed of a plurality of sections (preferably two) having their abutting ends connected by a glued tongue-and-groove joint, the outer surface being grooved eccentrically to the general line of curvature of the inner member at the joints, together with outer or connecting members conforming to the eccentric grooves and glued to the inner member. By varying the cross-section of the rim the invention is made applicable to wheels other than those intended for bicycles, for example, to steering wheels for motor vehicles.

In the drawings, Figure 1 is a side elevation of a rim constructed according to my invention and intended for use as a bicycle rim. Fig. 2 is a longitudinal section in the vicinity of one of the joints. Fig. 3 is an exterior plan view corresponding to Fig. 2. Fig. 4 is a fragmentary interior plan view corresponding to Fig. 3. Fig. 5 and Fig. 6 are sections on the lines 5—5 and 6—6 of Fig. 2. Figs. 7 and 8 are similar sections showing the invention applied to rims of circular radial cross-section, such as are used on steering wheels for motor vehicles.

Like reference characters refer to like parts throughout the several views.

In the embodiment of the invention shown, the inner member is formed of two wooden sections 1 that abut each other and have their ends provided with the circumferentially extending tapering interengaging tongues 2 which, when assembled, are coated with glue. It will be observed that the ends of the sections are cut diagonally of the circumference of the rim, thus increasing the length of the joint. The inner surface 3 of the member is substantially circular in radial cross-section, whereas the outer surface 4 is shaped to form a reentrant circumferential groove 5 which merges gradually into the surface 3. At the joints the inner member is further grooved circumferentially eccentrically of the general curvature of the rim, as indicated at 6, and tapering connecting members 8, that conform thereto, are glued in place. The exterior surface of the connecting members is of the same configuration or transverse profile as that of the inner members at points remote from the joints, and it will be observed that the centers of curvature of the inner faces of the members 8 lie on the same side of the rim at the splice point as does the center of curvature of the rim as a whole. This feature is of importance as it enables the use of a long connecting member.

By changing the cross-section so as to form substantially a full circle, as shown in Figs. 7 and 8, the invention may be applied to rims for steering wheels.

It is obvious that the details of construction may be varied without departing from the spirit of my invention, and I do not, therefore, wish to be limited otherwise than as indicated by the subjoined claims.

I claim:—

1. A substantially circular wheel-rim comprising an inner member formed of abutting sections, the inner surfaces of said sections being convex and the outer surfaces being concave, the outer surfaces of the sections being grooved near the ends eccentrically to the curvature of the rim, and connecting members conforming to said eccentric grooves, said connecting members and the ends of the sections being united to each other by cementitious material, the surfaces in which the inner member meets the connecting members being curved longitudinally about points located on the same side of the rim as is the center of the latter at the connecting points, whereby a large cementing surface is afforded.

2. An endless wooden wheel rim comprising an inner member having its ends abutting, each of the ends having a plurality of tongues, the tongues on one end interengaging with the tongues of the adjacent end to form joints, some of the tongues terminating at different points circumferentially of the wheel than others, the outer surface of said inner member being curved transversely and being grooved longitudinally, and a connecting piece received in said groove, said abutting ends being joined to each other and to said connecting piece by glue.

3. A substantially circular wheel-rim comprising an inner member the ends of which abut and have interengaging tongues arranged in the plane of the wheel and glued together to form a joint, the outer surface of said inner member being grooved at the joint eccentrically to the line of curvature of the wheel-rim, and a connecting member conforming to said eccentric groove and glued to the ends of the inner member, the surface in which the inner member meets the connecting member being curved longitudinally about a point located on the same side of the rim as is the center of the latter at the joint, whereby a large gluing surface is afforded.

EDWARD J. LOBDELL.

Copies of this patent may be obtained for five cents each, by addressing the "Commissioner of Patents, Washington, D. C."